April 14, 1970     H. L. DRAPER ET AL     3,505,820
LEAK DETECTION FOR LINED RESERVOIRS
Filed Dec. 28, 1967
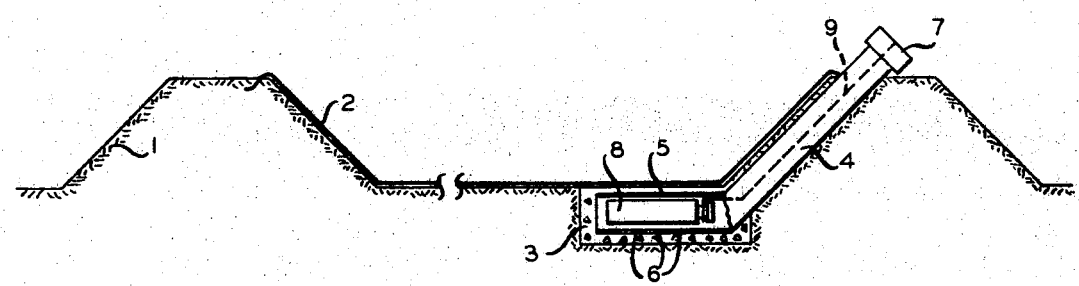
INVENTORS
H. L. DRAPER
D. W. GAGLE
R. J. BENNETT
BY
*Young & Quigg*
ATTORNEYS

United States Patent Office 3,505,820
Patented Apr. 14, 1970

3,505,820
LEAK DETECTION FOR LINED RESERVOIRS
Homer L. Draper, Duane W. Gagle, and Richard J. Bennett, Bartlesville, Okla., assignors to Phillips Petroleum Company, a corporation of Delaware
Filed Dec. 28, 1967, Ser. No. 694,284
Int. Cl. E02b *3/00;* G01m *3/04*
U.S. Cl. 61—1      4 Claims

ABSTRACT OF THE DISCLOSURE

A liquid collection zone containing aggregate is provided at a low level beneath the liner of a lined reservoir. A conduit which can be plastic leads from this zone up to a point peripheral to the lined reservoir. To test for leakage a provided closure at the end of the conduit is removed and a sampler, for example, a bottle at the end of a rod or wire is pushed down into the zone beneath the lined reservoir. Any liquid accumulating there is now withdrawn by withdrawing the now filled bottle and is analyzed, if desired, to determine whether it is ground water or leakage from the lined reservoir.

---

This invention relates to detection of leaks from lined reservoirs. In one of its aspects the invention relates to a method for detection of leaks from lined reservoirs. In another of its aspects the invention relates to a structure for a lined reservoir for detecting leaks therefrom.

In one of its concepts the invention provides a method for detecting leaks from lined reservoirs which comprises inserting into a zone beneath a lined reservoir at which leaks liquid can collect a container into which leaked collected liquid can flow and then removing the container from said zone with any liquid which has flowed thereinto. In another of its concepts the invention provides a lined reservoir having below a lining therein a liquid collection zone or pit containing a member or members designed to permit liquid to collect and to permit insertion to or near to said zone of a container into which collected liquid can flow and means such as a conduit connecting said collection pit with a point usually peripheral to said reservoir to which the container which has been inserted to the collection pit or zone and filled, at least in part, with liquid collected therein can be examined or otherwise dealt with.

It has now occurred to us to insert below a lined reservoir or pit a pipe such as a plastic pipe so that the pipe extends from a point peripheral to the reservoir to a low point below the reservoir, the low end of the pipe extending into a gravel or crushed stone bed, preferably perforated at its low end, so that liquid collecting in the bed can percolate into the pipe. By attaching a bottle to a wire or rod and pushing the same through the pipe to the lower end, the bottle can be filled with any collected liquid in the pipe and drawn from the pipe and checked for any leak liquid which can be further checked by laboratory analysis to determine the nature of the liquid. Further, it has occurred to us, depending upon the liquid being stored in the reservoir, to use a dye or other ingredient which will show immediately upon visual inspection or other inspection as may be desired the nature of liquid removed from the lower end or sampling end of the pipe.

It is an object of this invention to provide means for determining whether a lined reservoir, such as lined water reservoir, has leaks therein. It is another object of the invention to provide a means for determining readily and visually the nature of any leak or liquid beneath a liner reservoir. It is a further object of the invention to provide a method for determining whether there is liquid below a lined reservoir. It is a further object of the invention to provide a method for determining immediately, as by visual inspection, whether liquid accumulating below a lined reservoir has leaked therefrom.

Other aspects, objects, and concepts of the invention are apparent from a study of this disclosure, the drawing and the appended claims.

According to the present invention there is provided beneath a lined reservoir a zone into which leaked liquid can collect, connecting said zone with a point usually peripheral to and at the surface of the area in which the reservoir is situated and passing through said pipe into any collected liquid at said zone, a container into which collected liquid can flow following which upon removal of the container collected liquid can be observed and its nature as to whether it is leaked liquid determined.

Also according to the invention, there is provided a lined reservoir, a bed beneath said reservoir, at least in part arranged to collect liquid therein, a pipe connecting a low point below said reservoir and in said bed with a point at the surface of the area in which the reservoir is placed and means such as a bottle placed at the end of a wire or rod for running the bottle into collected liquid at the lower end of the pipe whereby to withdraw any collected liquid from below said reservoir.

In one embodiment of the invention a lined reservoir or water hole for storing some liquid which can be water or of other nature is provided over a prepared bed, part of which is constituted by, say, gravel or otherwise, structure to retain collected liquid therein. This point is connected to the ground surface by means of a pipe extending into the gravel or other structure. This pipe is preferably perforated at its end so that liquid accumulating in the gravel bed can percolate into the pipe. Also provided is a bottle attached to the end of a wire or flexible rod so that the bottle can be pushed through the pipe to the gravel bed to collect any liquid therein in an amount sufficient so that the fact of leakage can be determined as by visual inspection of the liquid or by analysis or otherwise. In a now preferred embodiment there can be placed in the liquid in the reservoir a dye, the color of which can be visually observed in the bottle when it is withdrawn from the gravel bed beneath the lined reservoir. In a modification of this now preferred embodiment at least one ingredient which will react with another is placed in the reservoir and the other ingredient will be in the bottle so that it will mix with the liquid which may have leaked from the reservoir and yield upon reaction therewith a visual or other indication of leakage from the lined reservoir. Or, liquid withdrawn from a reservoir containing liquid which contains at least one such component can be caused at the surface to be intermingled with some indicator to show whether any liquid collected from the gravel bed has in fact come from the lined reservoir.

Referring now to the single figure, 1 indicates a formed reservoir containing liner 2 arranged on the surface of the ground. At a low point below the reservoir there is provided a gravel bed 3 into which extends plastic pipe 4, perforated at its lower end 5 with perforation 6. A cap 7 is provided to keep foreign matter or trash, such as leaves or other material which may plug the pipe, from entering the pipe when it is not in use. There is shown at the lower end of pipe 4 a bottle 8 attached to wire 9. To operate the invention cap 7 is removed thus permitting wire 9 to be pulled upon. This pulls bottle 8 from gravel bed 3 together with any liquid which may have leaked from the liner or otherwise collected in the gravel bed from pipe 4. The bottle can then be visually inspected. As shown cap 7 serves to secure within the pipe the wire and bottle when not in use. If desired, the cap 7 can be fixed onto a rod passing therethrough so that the cap merely remains upon the rod when the botle is pulled therewith. In this manner replacement of the bottle automatically insures that the cap will be also replaced to protect the inside of the pipe and the bottle.

The lining in the pit can be made of any desired material and does not form a part of the present invention. In the embodiment described the liner is made of a polyolefin such as polypropylene. Usually the liner is made of a polypropylene fabric which has been covered with one or more impregnations of asphalt. The pipe will be made of plastic since this avoids many problems encountered with pipe made of other materials and this pipe will be about 2 inches in diameter. It will be installed flush with the grade along the bottom of the reservoir pit and up the slope with the lower end placed as noted in a gravel or crushed stone bed, the pipe being perforated along the lower end in the embodiment described. While the pipe is shown to extend to the top of the slope to a point convenient for taking the sample, it is clear that other construction within the invention is possible.

In case of a very large reservoir or lake, it is within the scope of the invention to provide several gravel beds and several sampling pipes. These pipes can extend upwardly through the liner to a point above the surface of the stored liquid so that investigation at several different places can be conducted. This in some instances will give a better idea of where the leakage may have occurred. It will then be possible to dam off a portion of the reservoir for repair without interrupting use of other portions thereof.

A good lining for the storage of liquid fertilizer has been found to consist of 2-ply application of polypropylene fabric and cationic asphalt emulsion. This liner is also particularly well suited for brine storage as at an oil lease.

EXAMPLE

A double layer of non-woven fabric of fine-denier polypropylene fiber weighing aproximately 5 ounces per square yard having high resistance to fungus and bacteria and not brittle at −40° F. and causing no problems in hot summer temperature is saturated with the asphalt exhibiting good tensile properties. Thus, pull tests show that the material will elongate more than 80 percent before failure. This highly desirable property protects against surface leaks in the event of shifting or cracking of the underlining course. Nevertheless, to provide for long term control and inspection, there is placed beneath the liner at a low point a gravel bed such as indicated in the drawing at 3. A Marlex (trademark for polyolefin) pipe 4 is connected into the gravel bed as shown in the drawing. There is placed into the pipe a wired bottle also as shown in the drawing.

Cationic emulsion used in this example is prepared from 85/100 penetration base asphalt with a ring and ball softening point of the order of 150° F. This emulsion has the advantage of a low temperature application (125° F. or less).

The side slopes are about 2:1 maximum to minimize run-off of asphalt application in preparing the reservoir or lagoon. In this embodiment, the lower end of the pipe is perforated as earlier explained.

The upper ends of the fabric at ground surface are buried in a peripheral trench and the pipe extends through the folded over end and up a few inches above the ground level.

Ponds can be of any size. Currently used ponds or pits are from 50 feet by 100 feet and 6 feet deep to 200 feet by 200 feet and 25 feet deep.

Reasonable variation and modification are possible within the scope of the foregoing disclosure and the drawing of the invention the essence of which is that there have been provided method and structure for a lined reservoir, there being beneath the lined reservoir a zone or structured area into which liquid which may have leaked from the reservoir can collect, a apipe extending from said structured area to a point at which a liquid container can be inserted into said pipe and pushed or otherwise caused to enter into said structured area to sample any liquid which may have collected therein followed by removal of said container from said pipe substantially as set forth and described.

We claim:
1. A reservoir construction comprising in combination a lined reservoir, a structure at a place below the lining in said reservoir adapted to collect liquid below said lining and a pipe extending from a point in said structure to a place at which a sample bottle can be conveniently inserted thereinto and removed therefrom.

2. A construction according to claim 1 wherein a cap is provided at the end of said pipe at said place to prevent foreign objects from undesirably entering into said pipe.

3. A construction according to claim 1 wherein a sampling bottle atached to a wire or rod is inserted into said structure and the wire or rod extends to be clamped by said cap.

4. A construction according to claim 1 wherein said liner is placed onto a formed cavity in the ground surface, the peripheral portion of said liner extends to and into a ditch surrounding said cavity and is there retained by a covering of earth or similar material and said pipe extends upwardly through said portion.

References Cited

UNITED STATES PATENTS

| | | | |
|---|---|---|---|
| 709,858 | 9/1902 | Arthurs | 73—425.4 |
| 1,825,280 | 9/1931 | Oxer | 73—40.5 |
| 2,460,054 | 1/1949 | Wiggins. | |
| 2,691,134 | 10/1954 | Ford | 73—40 XR |
| 2,924,352 | 2/1960 | Santner et al. | 73—40.5 XR |
| 3,276,266 | 10/1966 | Auer | 73—425.4 |
| 3,344,607 | 10/1967 | Vignovich | 61—.5 |
| 3,375,702 | 4/1968 | Birman | 73—40 |

LOUIS R. PRINCE, Primary Examiner

H. C. POST III, Assistant Examiner

U.S. Cl. X.R.

73—40, 425.4